(12) United States Patent
Ito et al.

(10) Patent No.: US 7,191,367 B2
(45) Date of Patent: Mar. 13, 2007

(54) STORAGE UNIT, CONDITION MONITORING PROGRAM PRODUCT, AND CONDITION MONITORING PROGRAM STORAGE MEDIUM

(75) Inventors: Masahiro Ito, Higashine (JP); Kenichi Suto, Higashine (JP); kenji Yoneki, Higashine (JP)

(73) Assignee: Fujitsu Limited, Kawasaki (JP)

( * ) Notice: Subject to any disclaimer, the term of this patent is extended or adjusted under 35 U.S.C. 154(b) by 621 days.

(21) Appl. No.: 10/319,766

(22) Filed: Dec. 13, 2002

(65) Prior Publication Data

US 2004/0078720 A1    Apr. 22, 2004

(30) Foreign Application Priority Data

Mar. 29, 2002    (JP)    .............................. 2002-097469

(51) Int. Cl.
  G06F 11/00    (2006.01)
  G06F 11/34    (2006.01)

(52) U.S. Cl. .............................. 714/47; 714/42; 714/49
(58) Field of Classification Search ..................... None
  See application file for complete search history.

(56) References Cited

U.S. PATENT DOCUMENTS

| | | | | |
|---|---|---|---|---|
| 5,404,509 A | * | 4/1995 | Klein | 707/101 |
| 5,410,439 A | * | 4/1995 | Egbert et al. | 360/75 |
| 5,894,596 A | * | 4/1999 | Hayes, Jr. | 455/418 |
| 6,170,067 B1 | * | 1/2001 | Liu et al. | 714/48 |
| 6,249,887 B1 | * | 6/2001 | Gray et al. | 714/47 |
| 6,553,241 B2 | * | 4/2003 | Mannheimer et al. | 600/323 |
| 6,600,614 B2 | * | 7/2003 | Lenny et al. | 360/31 |
| 6,708,297 B1 | * | 3/2004 | Bassel | 714/47 |
| 6,820,205 B2 | * | 11/2004 | Odaohhara et al. | 713/300 |
| 2002/0174384 A1 | * | 11/2002 | Graichen et al. | 714/37 |
| 2003/0061546 A1 | * | 3/2003 | Collins et al. | 714/42 |
| 2003/0112452 A1 | * | 6/2003 | McIntyre | 358/1.1 |

FOREIGN PATENT DOCUMENTS

| | | |
|---|---|---|
| JP | 4-165538 | 6/1992 |
| JP | 6-051915 | 2/1994 |
| JP | 10-134527 | 5/1998 |
| JP | 11-353682 | 12/1999 |

* cited by examiner

*Primary Examiner*—Scott Baderman
*Assistant Examiner*—Joseph Schell
(74) *Attorney, Agent, or Firm*—Greer, Burns & Crain, Ltd.

(57) ABSTRACT

The present invention provides a storage unit for accessing a storage medium according to a direction from a computer, a condition monitoring program product executed in the computer to which the storage unit is connected, and a storage medium thereof, having a configuration advantageously providing information for a user to properly address an abnormal condition in the storage unit. The storage unit includes a date storage module for storing a current date reported from the computer only a first time the storage unit is connected to the computer and maintains subsequently the date. The condition monitoring program receives the date stored in the date storage module from the storage unit connected to the computer and presents a message according to the number of days elapsing between the date and the current date.

7 Claims, 16 Drawing Sheets

| ERROR CODE | VOLTAGE CODE | DATE |
|---|---|---|
| ERROR ADDRESS | MEDIUM CODE | TEMPERA-TURE CODE | EXECUTION CODE |

Fig. 9

| INITIAL REGISTRATION DATE |
|---|
| MOST RECENT CLEANING DATE |

Fig. 10

| FIRMWARE VERSION NUMBER | UNIT VERSION NUMBER | PACKAGE VERSION NUMBER | DATE |
|---|---|---|---|

Fig. 11

| NAME |
|---|
| POSTAL ADDRESS |
| TELEPHONE NUMBER |
| UNIT MODEL |
| REGISTRATION DATE |
| E-MAIL ADDRESS |

Fig. 12

| DRIVER VERSION NUMBER |
|---|
| FORMATTER VERSION NUMBER |
| DIAGNOSTICS TOOL VERSION NUMBER |

Fig. 13

| LD LIGHT EMISSION TIME |
| --- |
| NUMBER OF LD LIGHT UPS/LIGHT-OUTS |
| OPERATION TIME (INCLUDING SEEK TIME AND ACTUAL OPERATION TIME) |

Fig. 14

| GUARANTEED LD LIGHT EMISSION TIME |
| --- |
| GUARANTEED NUMBER OF LD LIGHT-UPS/LIGHT-OUTS |
| GUARANTEED OPERATION TIME |

Fig. 15

STORAGE UNIT, CONDITION MONITORING PROGRAM PRODUCT, AND CONDITION MONITORING PROGRAM STORAGE MEDIUM

BACKGROUND OF THE INVENTION

1. Field of the Invention

The present invention relates to a storage unit connected to a host apparatus, such as a computer, for accessing a storage medium according to a direction from the host apparatus, a condition monitoring program product executed in the host apparatus to which the storage unit is connected for configuring in the host apparatus a condition monitor that monitors conditions of the storage unit, and a condition monitoring program storage medium storing the condition monitoring program.

2. Description of the Related Art

Storage units for accessing storage media have been widely used as computer peripherals.

As is often the case, an abnormal condition in such a storage unit, an optical disk unit, for example, cannot be found until it results in a data failure in the process of practically using the optical disk unit, the optical disk unit becomes unrecognizable to the host computer to which it is connected, or other abnormal symptoms such as unusual noise or abnormal lighting of an LED indicator that are obvious to a user occur. Although the abnormal condition can be prevented at the time of early maintenance. However, when the user notices the abnormal condition, it may have resulted in a fatal failure. If such a failure occurs and the user sends the unit for repair or buys a new one, he or she does so without identifying which part of the unit has failed or what kind of failure has occurred. For example, if the optical disk unit has no failure but instead an optical disk loaded in the optical disk unit is defective, the user may misconceive that the optical disk unit is defective and sends the disk unit for repair or buys a new one. Or, if the nature of a failure is such that repairing the unit is more expensive than buying a new one but the user does not know it, he or she may send it for repair. Conversely, even if the failure can be easily remedied, the user may buy a new, expensive unit. If the user could know the nature of the failure, he or she would be able to avoid such improper or unnecessary actions.

A variety of approaches to detecting abnormal conditions in storage unit have been proposed. For example, Japanese Patent Laid-Open Publication No. 10-134527 discloses a disk reproduction apparatus that detects certain abnormal conditions and generates an alarm. However, the technology proposed in the application defines a single criterion for determining abnormal conditions, ranging from a minor to serious one, in the apparatus. The technology proposed in that application only increases the number of aspects of abnormal conditions, such as data failure, abnormal noise, and abnormal lighting of LED indicators, that are obvious to a user by one. It cannot report abnormal signs to the user in an earlier stage or incorporate in the criterion user' concept as to whether he or she treats it as a failure.

Japanese Patent Laid-Open Publication No. 6-51915 discloses a method in which an operation history and information about frequency of retries performed in a disk unit are recorded and, when a predetermined value is exceeded, a user is notified that the lifetime of the unit has expired.

Like the technology described earlier, this method defines a criterion for determining whether the lifetime has expired and indicates expiration of the lifetime. It also cannot report abnormal signs to the user in an earlier stage or incorporate in the criterion user's concept as to whether he or she treats it as a failure.

Japanese Patent Laid-Open Publication No. 11-353682 discloses a method in which a user is prompted to perform head cleaning when certain abnormal conditions occur.

Prompting the user to perform head cleaning when abnormal conditions occur may be one effective method. However, it would be more effective to prompt the user to periodically perform head cleaning before any abnormal conditions occur in order to avoid such conditions.

An optical disk unit does not necessarily remain connected to a particular computer until it is discarded from the starting point of using the optical disk unit, or management information held in a particular computer that controls the optical disk unit may be reset through the replacement of its hard disk, for example. If the computer is replaced with a new one and the optical disk unit connected to the old computer is connected to the new one just before the time of inspiring a cleaning, a counter counting intervals for prompting the user to perform head cleaning is initialized and therefore no message for prompting the user to perform head cleaning is provided until a long period of time expires after the connection of new computer. As a result, head cleaning is not performed, resulting in abnormal conditions.

A method is described in Japanese Patent Laid-Open Publication No. 4-165538 in which retries performed in a unit are counted at predetermined intervals, the number of retries is compared with criteria, and degradation determined from the comparison is reported to a user. However, a user receiving the report cannot know what to do about the problem and may uninformedly send the unit for repair.

In addition, in order to always properly manage the conditions of a storage unit, it is required to exactly know how much time has elapsed since the storage unit was brought into use. Storing the date on which the storage unit was brought into use in a computer to which the storage unit is connected may be one effective method for keeping track of the elapsed time. However, this information alone cannot show the exact elapsed time. This is because the computer to which the storage unit is connected can be updated or data storage means (a hard disk drive, for example) within the computer can be updated when it fails and, as a result, it can become impossible to exactly know the date on which the storage unit was first brought into use. A system may be provided in which customer information is registered and a date on which the storage unit was brought into use is stored as an item of the customer information. However, users do not always register themselves with the system. The system therefore is insufficient in terms of keeping track of the elapsed time. None of the above-described applications describe an approach to keeping track of time elapsing since a storage unit was brought into use.

SUMMARY OF THE INVENTION

In consideration of the above-described, an object of the present invention is to provide a storage unit having a configuration effective for providing information to a user so that the user can properly address an abnormal condition, a condition monitoring program product executed in a host apparatus, such as a computer, that is connected to the storage unit for configuring in the host apparatus a condition monitor that monitors conditions of the storage unit, and a condition monitoring program storage medium containing the condition monitoring program.

A first storage unit of the present invention that attains the above-described object is characterized in that it is connected to a host apparatus that accesses a storage medium according to a direction from the host apparatus, and comprises: a date storage module that stores date information reported from the connected host apparatus and retaining the date information; and a transmitter that transmits the date information stored in the date storage module to the connected host apparatus in response to a request from the host apparatus.

A first condition monitoring program storage medium of the present invention containing a condition monitoring program which is used together with the first storage unit is characterized in that it contains a condition monitoring program executed in a host apparatus to which a storage unit that accesses a storage medium according to a direction from the host apparatus is connected, the condition monitoring program configures in the host apparatus a condition monitor that monitors the condition of the storage unit, the condition monitor comprises: a transmission direction module that directs the storage unit connected to a computer to transmit a date if one is stored in a date storage module; a receiver that receives the date or a report indicating that no date is set, the date and the report being transmitted from the storage unit in response to the direction from the transmission direction module for the transmission of the date information; and a date information reporting module that transmits the current date to the storage unit to cause the storage unit to store the date information in the date storage module, in response to the reception by the receiver of the report indicating that no date is set.

A second condition monitoring program storage medium according to the present invention is characterized in that it contains a condition monitoring program executed in a host apparatus to which a storage unit that accesses a storage medium according to a direction from the host apparatus is connected, the condition monitoring program configures in the host apparatus a condition monitor that monitors the condition of the storage unit, the condition monitor comprises: a transmission direction module that directs the storage unit connected to the host apparatus to transmit date information; a receiver that receives the date information transmitted under the direction of the transmission direction module from the storage unit; and a message presentation module that presents a message according to the number of days elapsing between a date represented by the date information received in the receiver and the current date.

The first storage unit and the condition monitoring program stored in the first condition monitoring program storage medium can properly keep track of a period of time that has elapsed since the storage unit was brought into use even if the storage unit is subsequently connected to another host apparatus or management information about the storage unit stored in the host apparatus to which the storage unit is connected is reset, because the storage unit transmits date information to the host apparatus to cause the host apparatus to store the date information in the storage unit and the storage unit maintains that date information. Thus, when the condition monitoring program stored in the second condition monitoring program storage medium is applied, a proper message can be presented to a user based on the elapsed time period properly maintained.

A second storage unit of the present invention that achieves the above-described object is characterized in that it is connected to a host apparatus for accessing a storage medium according to a direction from the host apparatus, and comprises: a history storage module that receives date information from the connected host apparatus, associating a history record of an abnormal condition that occurs in the storage unit with date information about a date on which the abnormal condition occurs and storing the history record with the date information; and a transmitter that transmits the history record of the abnormal condition stored in the history storage module to the connected host apparatus in response to a request from the host apparatus.

A third condition monitoring program storage medium of the present invention containing a condition monitoring program which is preferably used together with the second storage unit is characterized in that it contains the condition monitoring program executed in a host apparatus to which a storage unit that accesses a storage medium according to a direction from the host apparatus is connected, the condition monitoring program configuring in the host apparatus a condition monitor that monitors the condition of the storage unit, the condition monitor comprising: a transmission direction module that directs the storage unit connected to the host apparatus to transmit an abnormal condition history; a receiver that receives the abnormal condition history transmitted from the storage unit in response to the direction from the transmission direction module for the transmission of the abnormal condition history; and a message presentation module that presents a message according to the abnormal condition history received in the receiver.

The second storage unit of the present invention allows trouble shooting to be performed accurately and easily because a history of abnormal conditions occurring in the unit is associated with and stored with date information and the associated date information significantly affects the trouble shooting.

The third condition monitoring program storage medium of the present invention contains the condition monitoring program which analyzes an abnormal condition history with which date information is associated and presents a message to the user according to the abnormal condition history, thereby allowing the user to take measures such as head cleaning or purchasing a new product before the abnormal condition results in any serious failure.

Furthermore, even if the storage unit is subsequently connected to a different host apparatus, the host apparatus to which the unit is newly connected can know the history information because the abnormal condition history is stored in the storage unit.

Preferably, the history storage module in the second storage unit stores the occurrence of an abnormal condition if it is determined, against specification of types of abnormal conditions to be stored as a history record, that the abnormal condition should be recorded. In that case, the condition monitoring program stored on the third condition monitoring program storage medium configures a condition monitor having a history setting module for receiving the types of abnormal conditions to be recorded as history records which are input into the host apparatus in response to an input operation and setting them in the storage unit.

In this configuration, the user can specify information to be stored as a history according to his or her concept or requirements. For example, a history of major abnormal conditions alone or a history of abnormal conditions, including major and minor abnormal conditions, can be recorded.

The transmission direction module in the condition monitoring program stored on the third condition monitoring program storage medium may periodically direct the storage unit to transmit the abnormal condition history or direct the storage unit to transmit the abnormal condition history in response to a report of the occurrence of an abnormal condition provided from the storage unit.

In the configuration in which the transmission direction module directs the storage unit to transmit an abnormal condition history in response to a report of the occurrence of an abnormal condition provided from the storage unit, the storage unit is characterized in that it is connected to a host apparatus for accessing a storage medium according to a direction from the host apparatus, and comprises an abnormal condition reporting module that, if a pre-specified abnormal condition occurs, reports the occurrence of the abnormal condition to the host apparatus to which the storage unit is connected.

A third storage unit of the present invention that achieves the object described above is characterized in that it is connected to the host apparatus for accessing a storage medium according to a direction from the host apparatus, and comprises: an accumulative information storage module that stores accumulative information about the operations of the storage unit; and a transmitter that transmits the accumulative information stored in the accumulative information storage module to the computer in response to a request from the host apparatus.

A fourth condition monitoring program storage medium of the present invention that achieves the object described above is characterized in that it contains a condition monitoring program executed in a host apparatus to which a storage unit that accesses a storage medium according to a direction from the host apparatus is connected, the condition monitoring program providing the host apparatus with a function for monitoring the condition of the storage unit, and the condition monitor comprises: a transmission direction module that directs the storage unit connected to the host apparatus to transmit accumulative information; a receiver that receives the accumulative information transmitted under the direction of the transmission direction module from the storage unit; and a message presentation module that presents a message according to the accumulative information received in the receiver.

The "accumulative information" as used herein refers to information that is accumulated through the use of the storage unit and represents the usage condition of the storage unit. For example, the information includes the "operation time" of the storage unit, the number of accesses to the storage medium, such as reads/writes, and, if the storage unit is optical disk unit, light emission time and the number of light-ups/light-outs of LDs (Laser Diodes).

Because the accumulative information is stored in the storage unit and messages are displayed based on the accumulative information, the user can know accurate timing of part replacement. Furthermore, if the storage unit is connected to a different host apparatus, the apparatus can know proper accumulative information because the accumulative information is stored in the storage unit itself, rather than the host apparatus to which it is connected.

A condition monitoring program product according to the present invention which is used together with the storage unit is characterized in that it is executed in a host apparatus to which a storage unit that accesses a storage medium according to a direction from the host apparatus is connected, the condition monitoring program product configures in the host apparatus a condition monitor that monitors the condition of the storage unit, the condition monitor comprises: a transmission direction module that directs the storage unit connected to a computer to transmit a date if one is stored in a date storage module; a receiver that receives the date or a report indicating that no date is set, the date and the report being transmitted from the storage unit in response to the direction from the transmission direction module for the transmission of the date information; and a date information reporting module that transmits the current date to the storage unit to cause the storage unit to store the date information in the date storage module, in response to the reception by the receiver of the report indicating that no date is set.

BRIEF DESCRIPTION OF THE DRAWINGS

FIG. 9 shows log information in the optical disk unit;

FIG. 10 shows base date information.

FIG. 11 shows a version number and date of manufacture of the optical disk unit that are stored in the optical disk unit.

FIG. 12 shows customer information.

FIG. 13 shows information stored in a CD-ROM supplied with the optical disk unit purchased.

FIG. 14 shows accumulative information.

FIG. 15 shows reference information to be compared with the accumulative information shown in FIG. 14.

DETAILED DESCRIPTION OF THE PREFERRED EMBODIMENTS

An embodiment of the present invention will be described below.

Figure 1:
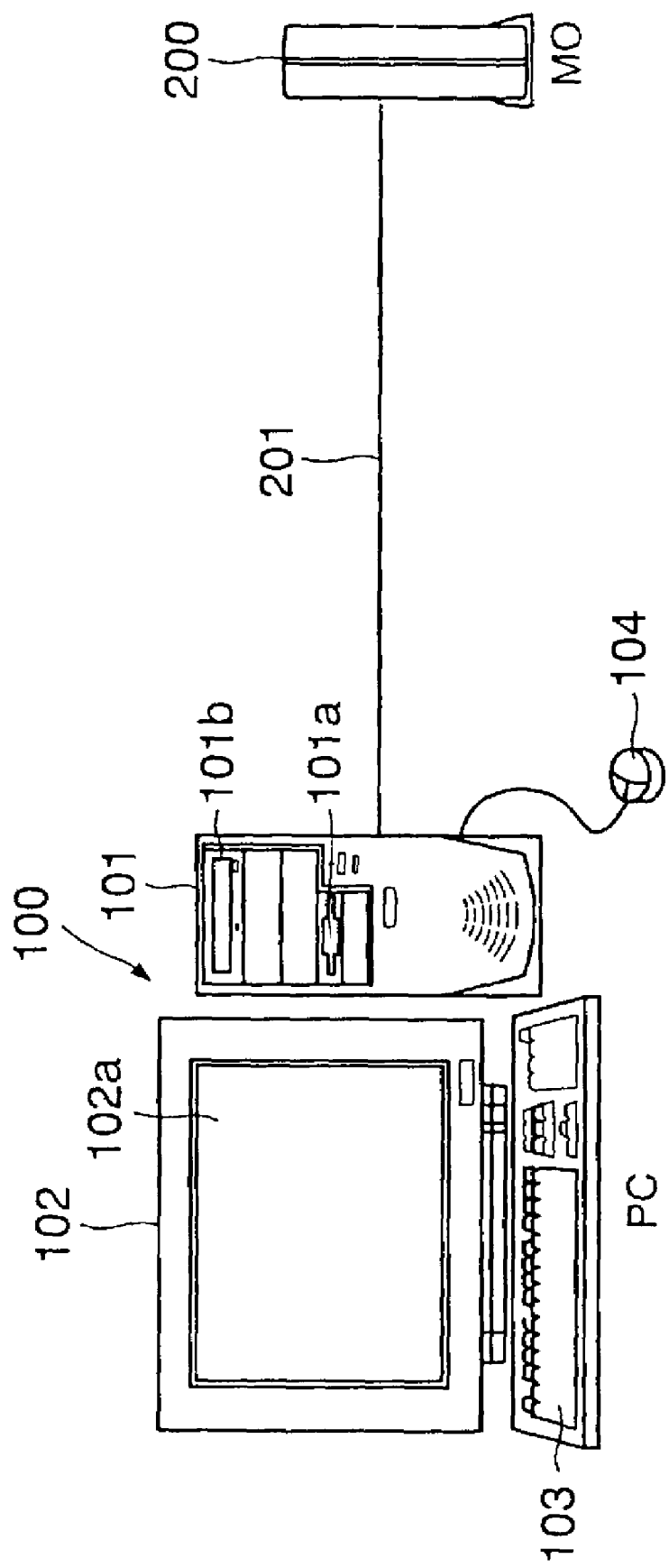
FIG. 1 is an external view of a personal computer to which an optical disk unit (MO), which is one embodiment of a storage unit according to the present invention, is connected.

FIG. 1 is an external view of a personal computer to which an optical disk unit (MO), which is one embodiment of a storage unit according to the present invention, is connected.

A personal computer (PC) 100 shown in FIG. 1 includes a main unit 101 containing a Central Processing Unit (CPU), a random access memory (RAM), a hard disk, a communication board, and other components, a display unit 102 for displaying images and text on a display screen 102*a* in accordance with an instruction from the main unit 101, a keyboard 103 for inputting instructions of a user into the personal computer 100, and a mouse 104 for pointing a position on the display screen 102a to input an instruction related to an icon displayed in the pointed position.

Viewing from outside, the main unit 101 further includes an FD slot 101a through which a flexible disk (FD) is inserted and a CD-ROM slot 101b through which a CD-ROM is inserted, and internally contains an FD drive and a CD-ROM drive for driving and accessing the flexible disk (FD) and CD-ROM loaded through their respective slots 101a and 101b.

An optical disk unit (MO) 200 is connected to the personal computer 100 through a USB cable 201.

Figure 2:
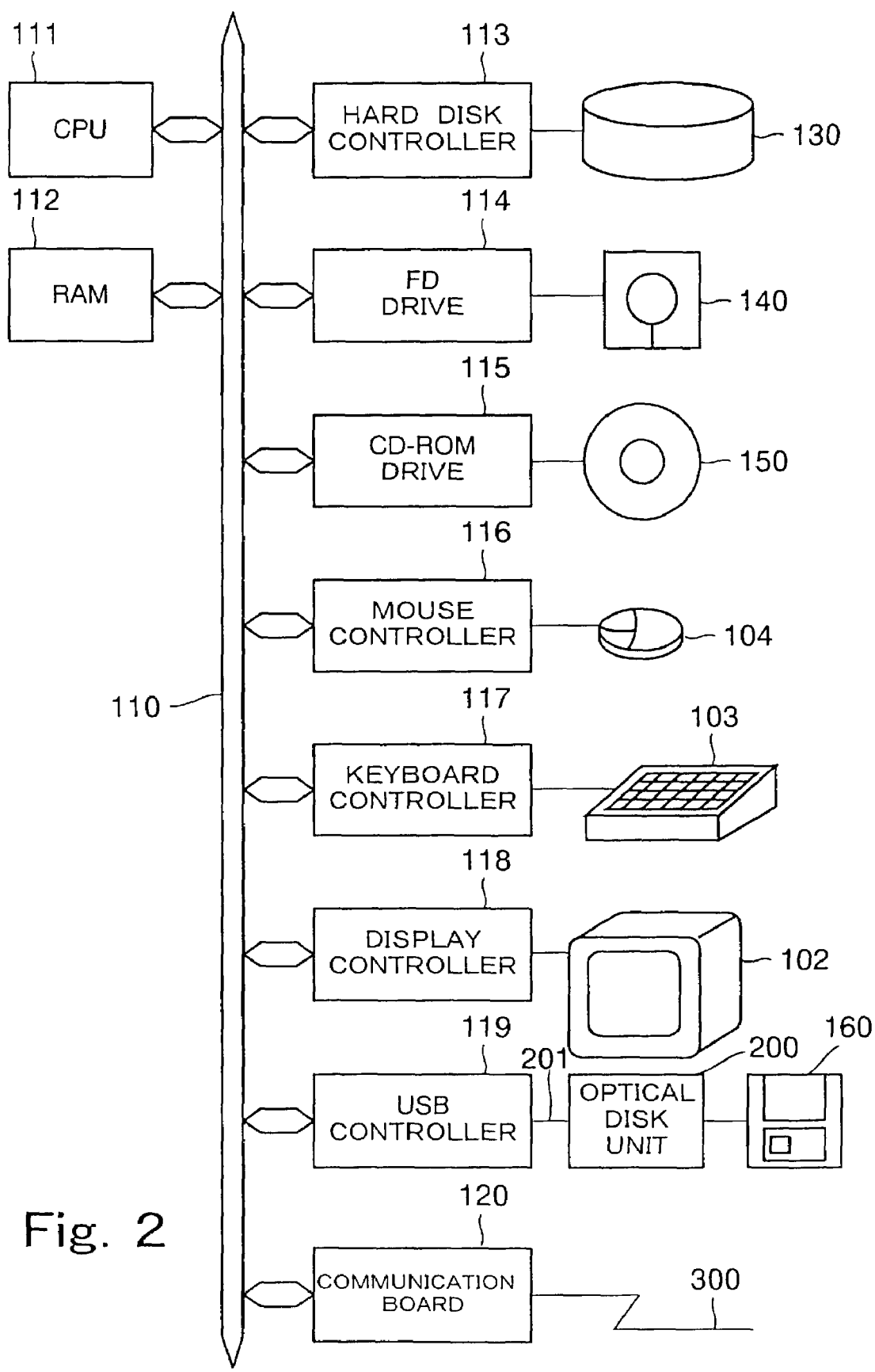
FIG. 2 shows a hardware configuration of the computer having an external view shown in FIG. 1.

FIG. 2 shows a hardware configuration of the computer having the external view shown in FIG. 1.

Shown in the hardware configuration diagram are the CPU 111, a RAM 112, a hard disk controller 113, a FD drive 114, a CD-ROM drive 115, a mouse controller 116, a keyboard controller 117, a display controller 118, a USB controller 119, and a communication board 120, which are interconnected through a bus 110.

The FD drive 114 and the CD-ROM drive 115 are used for accessing the FD 140 and a CD-ROM 150 loaded through the FD slot 101a and CD-ROM slot 101b, respectively, as described with reference to FIG. 1.

The USB controller 119 controls USB (Universal Serial Bus Interface)-compliant peripheral devices connected to it. In this embodiment, an optical disk unit 200 is connected to the USB controller 119 through a USB cable 201. An optical disk 160 is loaded in the optical disk unit 200. The optical disk 160 is accessed by the optical disk unit 200 under the control of the USB controller 119.

The communication board 120 is connected to the Internet over a communication cable 300.

Further shown in FIG. 2 are a hard disk 130 accessed by the hard disk controller 113, the mouse 104 controlled by the mouse controller 116, the keyboard 103 controlled by the keyboard controller 117, and a CRT display 102 controlled by the display controller 118.

Figure 3:
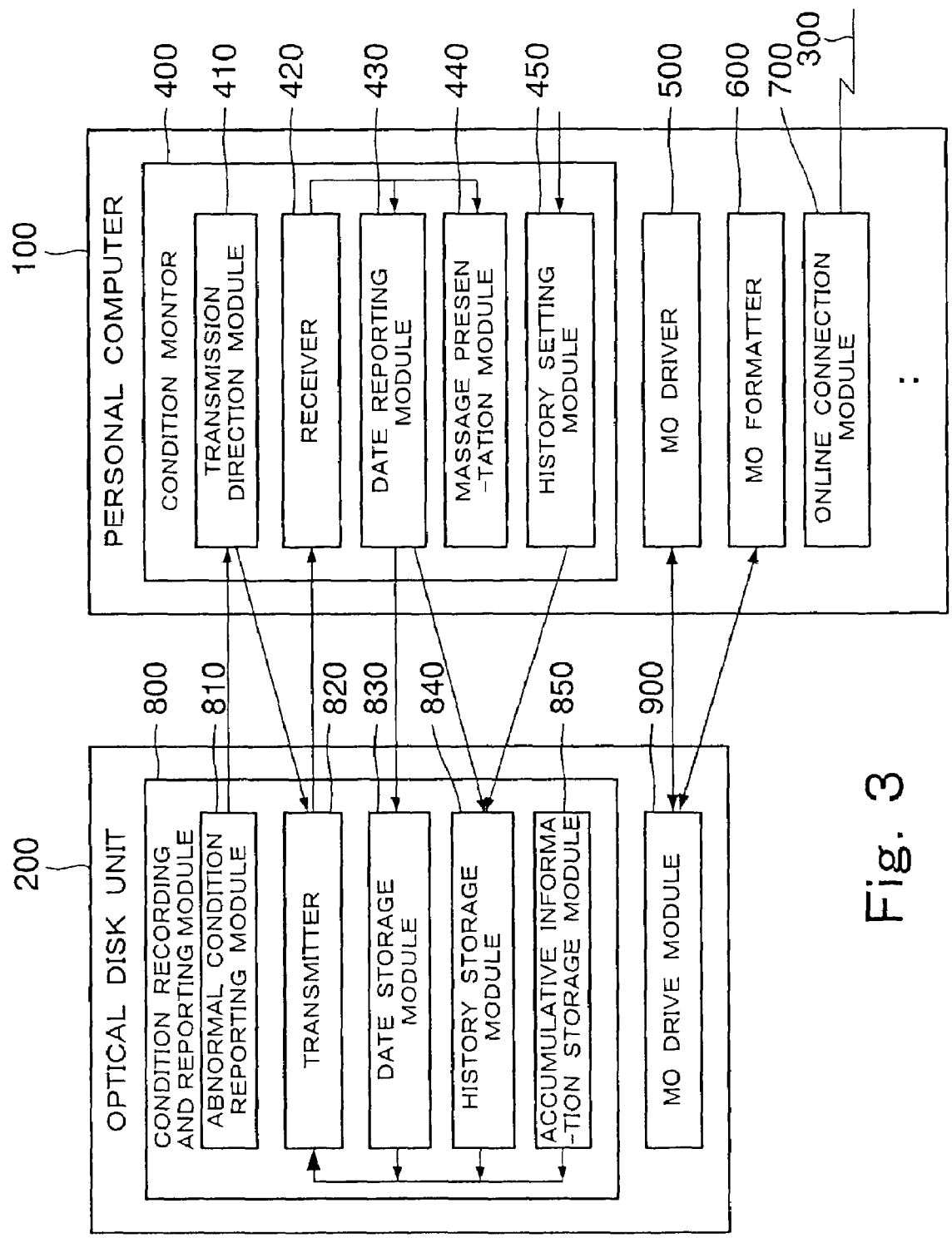
FIG. 3 shows a block diagram of functions configured in the computer shown in FIG. 2 and functions in the optical disk unit.

FIG. 3 shows a block diagram of functions configured in the personal computer 100 shown in FIG. 2 and functions in the optical disk unit 200.

A condition monitor 400, MO driver 500, MO formatter 600, and online connection module 700 are configured in the personal computer 100. While many other functions are also contained in the computer 100, only the functions that relate to the description of the embodiment of present invention are shown here.

The condition monitor 400 is configured in the personal computer 100 by installing and executing a condition monitoring program. The condition monitor 400 includes a transmission direction module 410, a receiver 420, a date reporting module 430, a message presentation module 440, and a history setting module 450. The condition monitoring program is stored in a program storage area of a RAM or hard disk in the personal computer.

Figure 4:
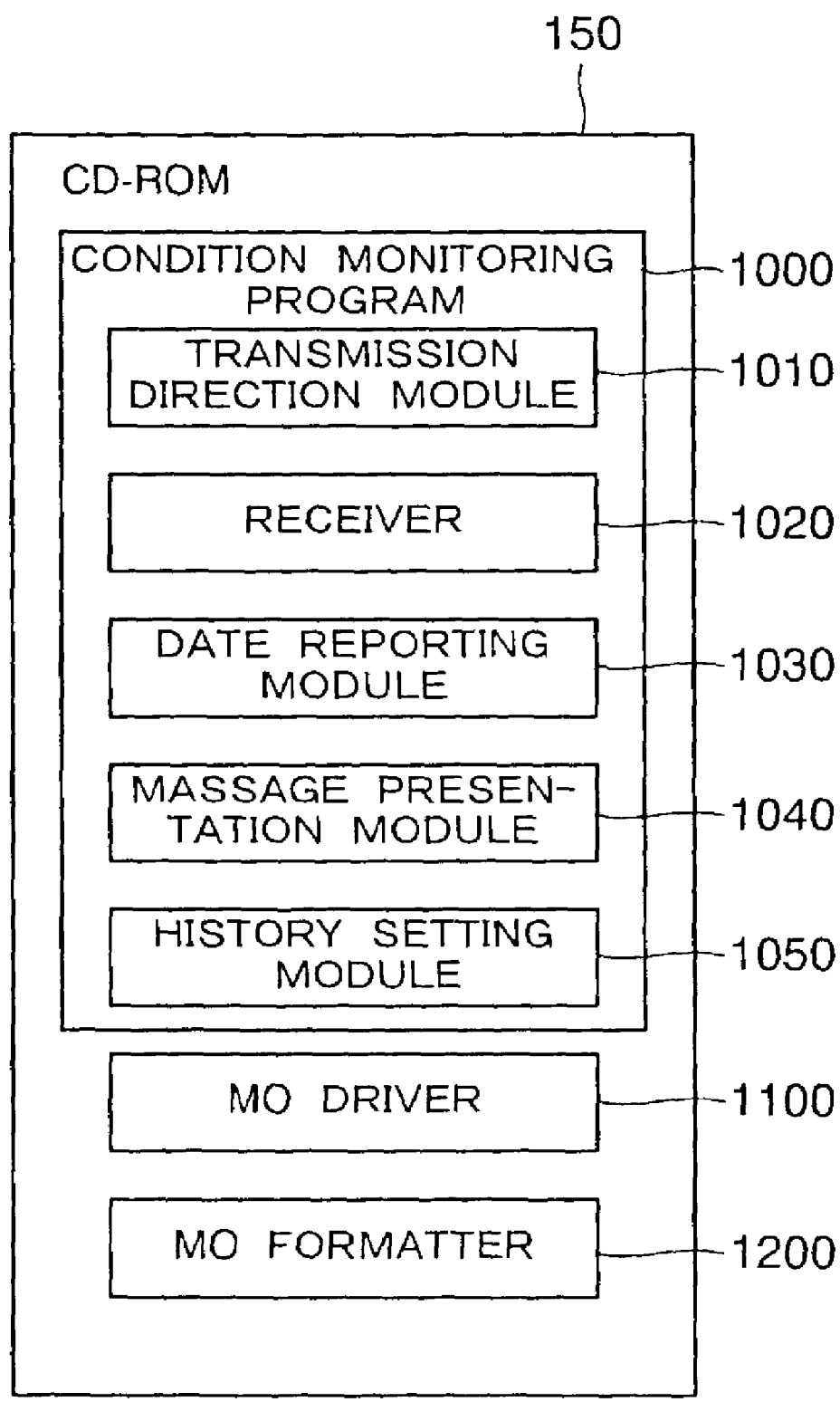
FIG. 4 shows a schematic diagram of a condition monitoring program.

FIG. 4 shows a schematic diagram of the condition monitoring program.

The condition monitoring program 1000 is stored in a CD-ROM 150, which is one embodiment of a condition monitoring program storage medium of the present invention, and includes a transmission direction module 1010, receiver 1020, date reporting module 1030, message presentation module 1040, and history setting module 1050.

The CD-ROM 150 also contains an MO driver 1100 and MO formatter 1200, in addition to the condition monitoring program 1000.

When the condition monitoring program 1000, MO driver 1100, and MO formatter 1200 stored on the CD-ROM 150 are installed in and executed on the personal computer 100 shown in FIGS. 1 and 2, the condition monitor 400, MO driver 500, and MO formatter 600 shown in FIG. 3, respectively, are configured. That is, the condition monitor 400 (the transmission direction module 410, receiver 420, date reporting module 430, message presentation module 440, and history setting module 450), the MO driver 500, and the MO formatter 600 configured within the personal computer 100 shown in FIG. 3 are formed by a combination of the hardware of the personal computer 100, an operating system (OS) running on the hardware, and an application program running on the OS. On the other hand, the condition monitoring program 1000 (the transmission direction module 1010, receiver 1020, date reporting module 1030, message presentation module 1040, and history setting module 1050), the MO driver 1100, and the MO formatter 1200 shown in FIG. 4 are formed by the application program of the combination.

Effects of the condition monitoring program 1000 (the transmission direction module 1010, receiver 1020, date reporting module 1030, message presentation module 1040, and history setting module 1050), the MO driver 1100, and the MO formatter 1200 shown in FIG. 4 when installed and executed in the personal computer 100 are the effects of the condition monitor 400 shown in FIG. 3 (the transmission direction module 410, receiver 420, date reporting module 430, message presentation module 440, and history setting module 450), the MO driver 500, and the MO formatter 600. The effects will be described herein with reference to FIG. 3 and the description of the condition monitoring program 1000 (the transmission direction module 1010, receiver 1020, date reporting module 1030, message presentation module 1040, and history setting module 1050), MO driver 1100, and MO formatter 1200 shown in FIG. 4 will be omitted.

The optical disk unit 200 in FIG. 3 includes a condition recording and reporting module 800 and an MO drive module 900. The condition recording and reporting module 800 includes an abnormal condition reporting module 810, a transmitter 820, a date storage module 830, a history storage module 840, and an accumulative information storage module 850.

In this embodiment, the condition recording and reporting module 800 is implemented by a firmware program of a controller in the optical disk unit (in particular, ODC firmware). The abnormal condition reporting module 810 forming a part of the condition recording and reporting module 800 recognizes an abnormal condition in the optical disk unit from the controller (in particular, a MPU or the ODC firmware). The transmitter 820 transmits information such as date information from the controller through an interface. Areas of non-volatile memory (such as flash ROM) are allocated to the date storage module 830, the history storage module 840, and the accumulative information storage module 850.

The MO drive module 900 of the optical disk unit 200 is loaded with an optical disk 160 (see FIG. 2) and actually accesses the loaded optical disk according to directions from the MO driver 500.

The condition recording and reporting module 800 of the optical disk unit 200 is responsible for recording various conditions (which will be described later) of the optical disk unit 200 and reporting the recorded conditions to the personal computer 100 in response to an instruction from the personal computer 100 or without waiting for an instruction from the personal computer 100 in certain circumstances.

On the other hand, the condition monitor 400 in the personal computer 100 communicates with the condition recording and reporting module in the optical disk unit 200 to monitor the conditions of the optical disk unit 200 and presents messages to a user. The MO driver 500 in the personal computer 100 directs the MO drive module 900 in the optical disk unit 200 to read data from the optical disk loaded in the MO drive module 900 and send it to the MO driver, or sends data to the MO drive module 900 to cause it to write the data onto the optical disk loaded in the MO drive module 900.

The MO formatter 600 formats an optical disk loaded in the MO drive module 900 in the optical disk unit 200.

The online connection module 700 includes hardware components such as the communication board 120 shown in FIG. 2 and provides communication over the communication cable 300 and the Internet.

The condition recording and reporting module 800 in the optical disk unit 200 and the condition monitor 400 configured in the personal computer 100 will be further described below.

If a predefined abnormal condition that requires an urgent action occurs in the optical disk unit 200, the abnormal condition reporting module 810, which is a part of the condition recording and reporting module 800, in the optical disk unit 200, reports the occurrence of the abnormal condition to the personal computer 100. The report is received by the transmission direction module 410, which is a part of the condition monitor 400 in the personal computer 100.

The transmitter 820, which is a part of the condition recording and reporting module 800, in the optical disk unit 200 receives a direction from the transmission direction module 410 of the personal computer 100, receives the date stored in the date storage module 830, an abnormal condition history stored in the history storage module 840, and accumulative information 850 stored in the accumulative information storage module 850, which will be described below, from the date storage module 830, history storage module 840, and accumulative information storage module 850 and transmits the information to the personal computer 100. The information sent from the transmitter 820 is received by the receiver 420, which is a part of the condition monitor 400 in the personal computer 100.

The date storage module 830 forming a part of the condition recording and reporting module 800 in the optical disk unit 200 stores the current date reported from the personal computer 100 only the first time it is connected to the personal computer 100 and maintains that date. Here, the reason why the date is stored is not limited to the fact that the date storage module is connected to the personal computer 100, however it is desirable that the date of the use starting is specified first time.

The history storage module 840 forming a part of the condition recording and reporting module 800 of the optical disk unit 200 stores a history of abnormal conditions having occurred in the optical disk unit 200. When the history storage module 840 stores the history of abnormal conditions having occurred in the optical disk unit 200, it associates the abnormal conditions having occurred in the optical disk unit 200 with the dates on which they occurred in response to the current date reported from the date reporting module 430 of the personal computer 100. The history storage module 840 obtains settings of the types of abnormal conditions to be stored as a history record from the history setting module 450 of the personal computer 100. If an abnormal condition to be stored in the history occurs, the history storage module 840 checks the condition against the settings and, if it determines that the condition should be stored as a history record, stores the occurrence of the abnormal condition.

The accumulative information storage module 850, which forms a part of the condition recording and reporting module 800 of the optical disk unit 200, updates and maintains accumulative information about operations of the optical disk unit 200. The accumulative information will be illustrated later.

The transmission direction module 410 of the condition monitor 400 configured in the computer 100 directs the transmitter 820 of the condition recording and reporting module 800 in the optical disk unit 200 to transmit a date in the case that a date is stored in the date storage module 830, an abnormal condition history stored in the history storage module 840, and accumulative information stored in the accumulative information storage module 850. The transmission direction module 410 directs the transmission of the abnormal condition history stored in the history storage module 840 periodically, for example once a day, as well as when it receives a report of the occurrence of an abnormal condition from the abnormal condition reporting module 810.

The receiver 420 of the condition monitor 400 in the personal computer 100 receives information sent from the transmitter 820, that is, a date stored in the date storage module 830 and sent from the transmitter 820 or a report indicating that no date is stored in the date storage module 830, an abnormal condition history stored in the history storage module 840, and accumulative information stored in the accumulative information storage module 850.

If the receiver 420 receives a report indicating that no date is stored in the date storage module 830, the date reporting module 430 receives the report from the receiver 420 and reports the current date to the date storage module 830 to cause the date storage module 830 to store it. The date reporting module 430 reports the current date to the history storage module 840 if required.

The message presentation module 440 receives a date stored in the date storage module 830 and received by the receiver 420 and presents a message that depends on the number of days that have elapsed between that date and the current date on the display screen 102a of the personal computer 100 shown in FIG. 1. It also receives an abnormal condition history stored in the history storage module 840 and received by the receiver 420 and presents a message according to the abnormal condition history. When the message presentation module 440 receives accumulative information stored in the accumulative information storage module 850, it presents a message according to the accumulative information on the display screen 102a of the computer 100 shown in FIG. 1.

The history setting module 450 sets the types of abnormal conditions to be maintained as history records in the history storage module 840 in the optical disk unit 200 according to an operation performed by the user on keyboard 103 or mouse 104 shown in FIG. 1.

Figure 5:
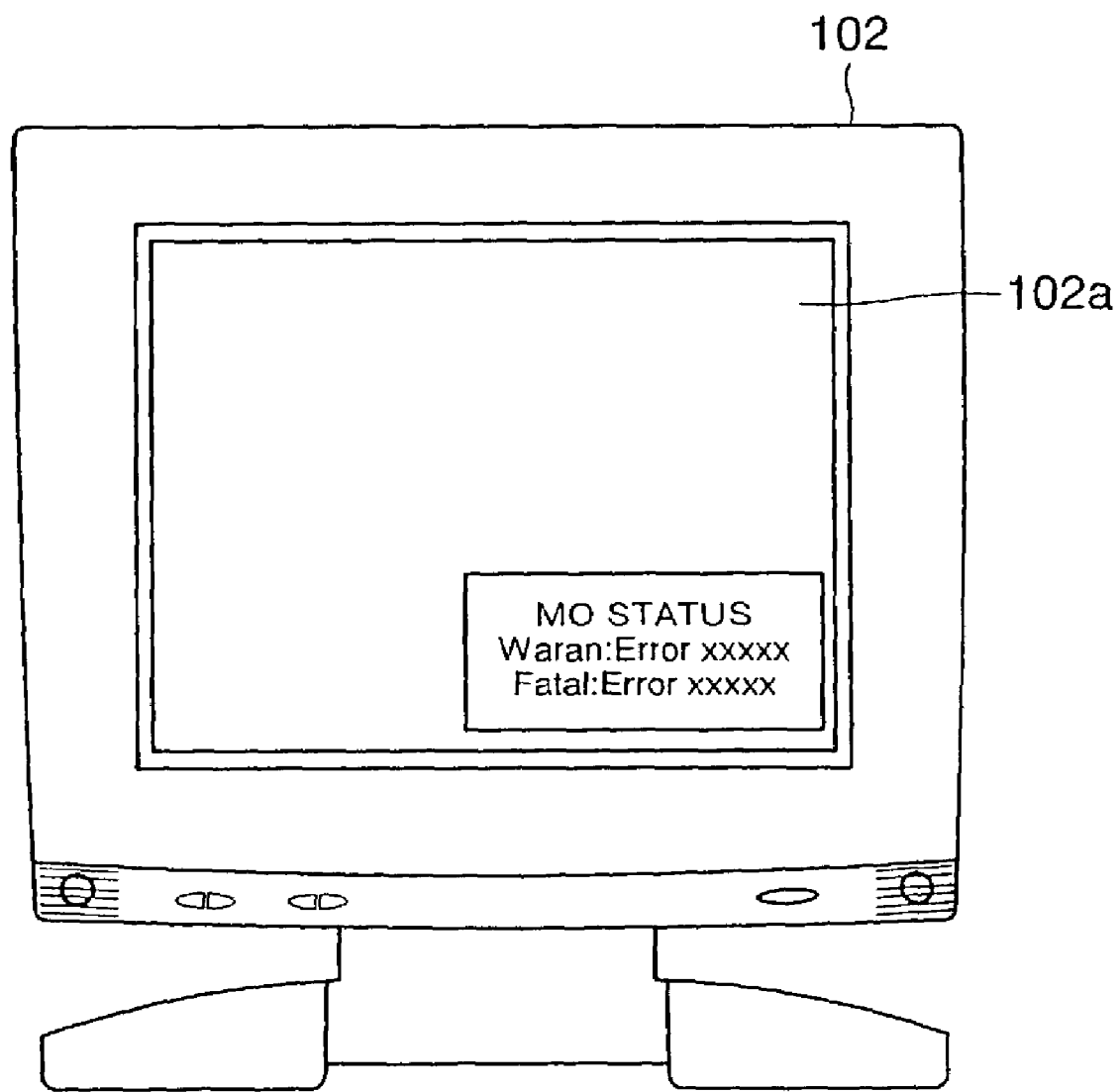
FIG. 5 shows an example of a message presented on a display screen.

FIG. 5 shows an example of a message presented on the display screen.

Shown in FIG. 5 is the display unit 102 of the personal computer 100 shown in FIG. 1. A message, "MO status . . . ", is displayed in the lower right corner of the display screen 102a of the display unit 102. The user can know the type and level of an abnormal condition having occurred in his or her optical disk unit and take action it an early time.

The condition monitor 400 in the personal computer 100 and the condition recording and reporting module 800 in the optical disk unit 200 shown in FIG. 3 will be further described below.

Figure 6:
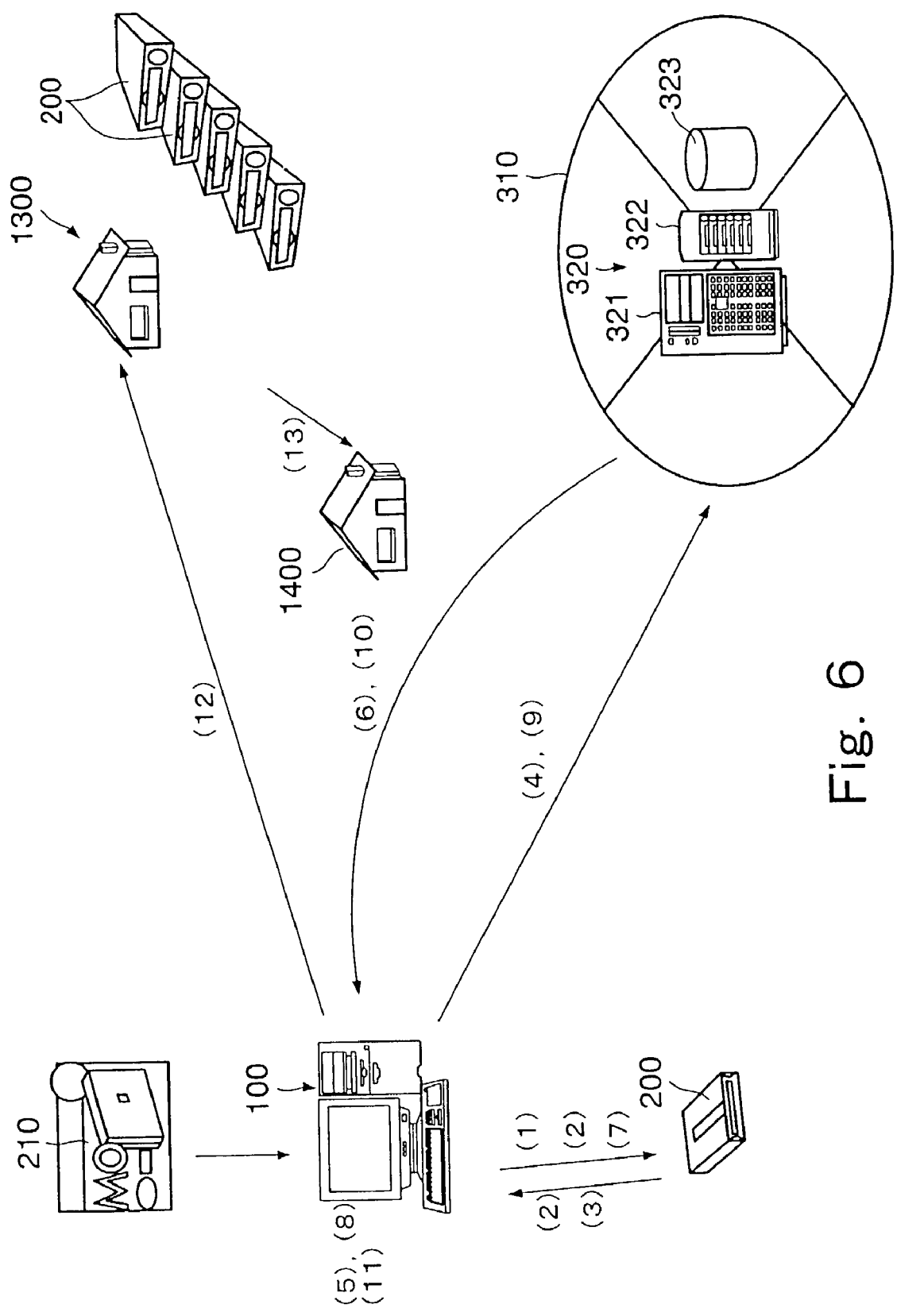
FIG. 6 shows a configuration of an entire system including an optical disk unit which is one embodiment of the storage unit of the present invention and a personal computer in which the condition monitoring program is installed.

FIG. 6 shows a configuration of the entire system including an optical disk unit, which is one embodiment of the storage unit of the present invention, and a personal computer in which the condition monitoring program is installed.

Shown in FIG. 6 are a personal computer 100, optical disk unit 200, server system 320 connected to the personal computer 100 over the Internet 310, a third party 1300, which accepts customer complaints and repair request concerning optical disk units 200 and performs services such as trouble shooting of optical disk units sent for repairing, and a factory 1400, which actually repairs the optical disk units. The server system 320 in this example includes an MO information server 321 for providing information such as new product information about optical disk units, an SQL server 322 in which customer information about users of optical disk units is registered, and a database 323 in which correspondence between failure symptoms and remedies are described. Also shown in FIG. 6 is an MO package 210 containing a newly purchased optical disk unit.

The MO package 210 contains, in addition to the optical disk unit 200, its warranty, user's manual, and a CD-ROM 150 containing such as the condition monitoring program 1000, MO driver 1100, and MO formatter 1200 shown in FIG. 4.

Figure 7:
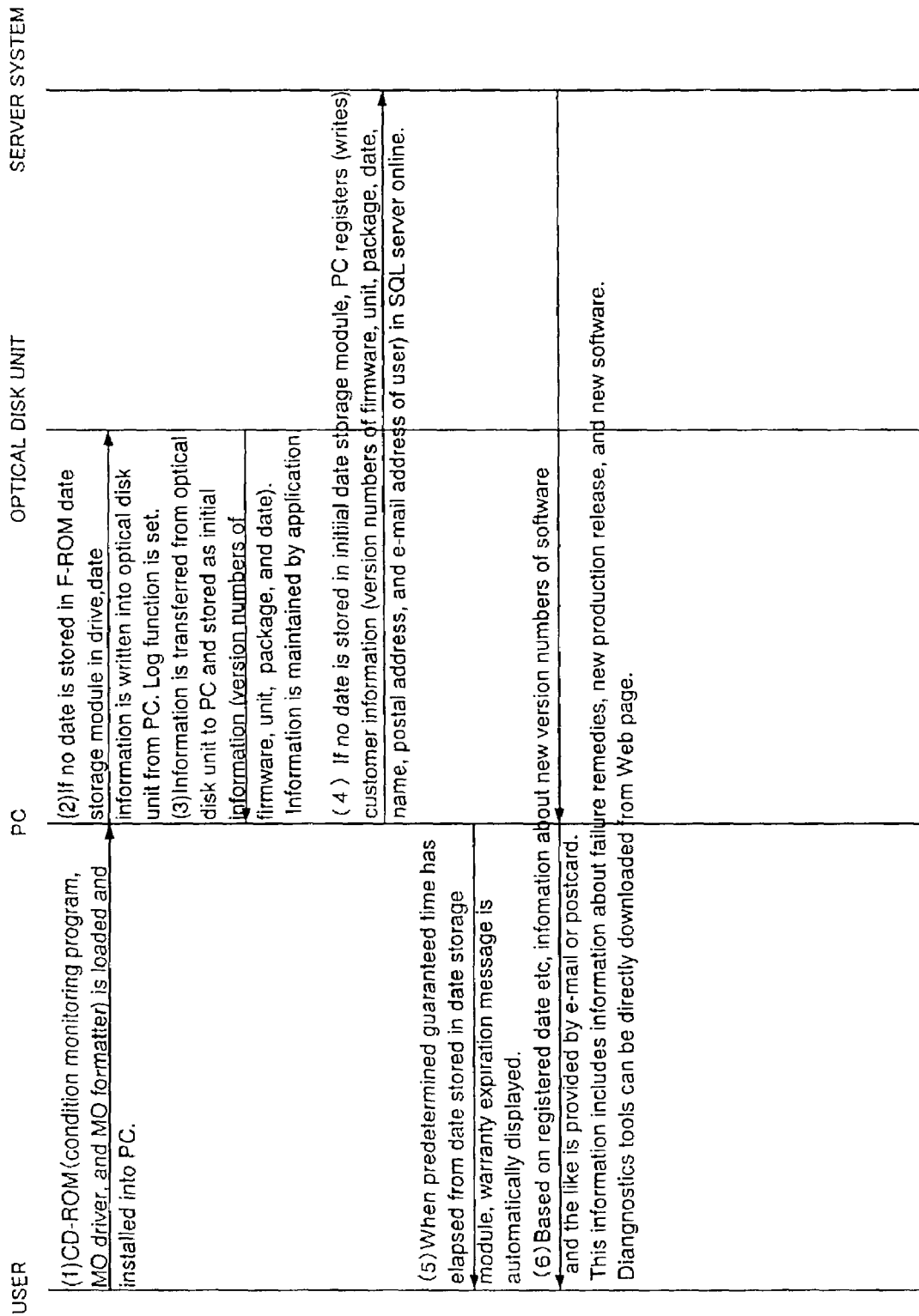
FIG. 7 shows a general outline of a process procedure performed in the entire system shown in FIG. 6.
Figure 8:
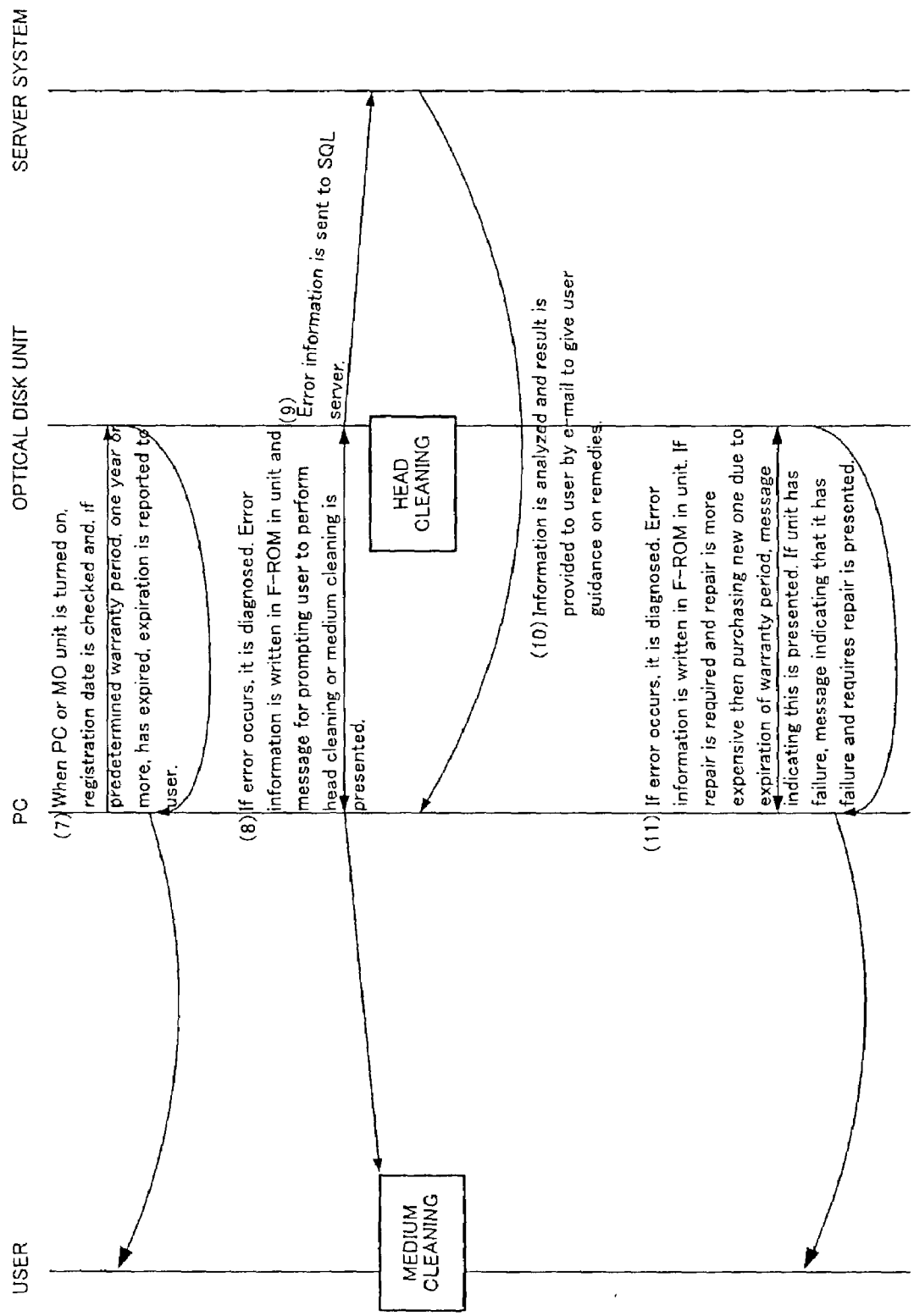
FIG. 8 shows the general outline of a process procedure performed in the entire system shown in FIG. 6.

FIGS. 7 and 8 show the general outline of a process procedure performed in the system shown in FIG. 6.

A stage in which the optical disk unit 200 is connected to the personal computer 100 to set up the optical disk unit 200 for ready to use will be described first with reference to the procedure shown in FIG. 7.

A user who purchased the MO package 210 takes the optical disk unit 200 out of the package and connects the optical disk unit 200 to the personal computer 100 through a USB cable 201 (see FIGS. 1 and 2). The user then inserts the CD-ROM 150 supplied with the optical disk unit 200 into the CD-ROM slot 101b of the personal computer 100 (see FIG. 1).

Then, the CD-ROM 150 inserted is driven by the CD-ROM drive 115 shown in FIG. 2 and the condition monitoring program 1000, MO driver 1100, and MO formatter 1200 stored on the CD-ROM 150 are installed into the personal computer 100 (step 1 in FIGS. 6 and 7).

Then the personal computer 100 requests the optical disk unit 200 to send a date stored in the date storage module 830 (see FIG. 3) to the personal computer 100 to inquire if any date is stored in it. If no date is stored, the personal computer 100 writes the current date information into the optical disk unit. In addition, information about what kind of abnormal conditions should be stored as log (history) records is provided by the user to the optical disk unit through an operation on keyboard 103 or mouse 104 of the personal computer 100 (step 2).

The optical disk unit 200 transfers initial information such as a firmware version number, unit version number, package version number, and the date of manufacture of the optical disk unit to the personal computer 100. The initial information is managed in the personal computer 100 (step 3), and if no initial date is set in the optical disk unit, customer information (including the firmware version number, unit version number, package version number, date, and the name, postal address, e-mail address of the user) is sent online from the personal computer 100 to the SQL server 322, which forms a part of the server system, over the Internet 310 and registered in it (step 4).

When a predetermined time (for example one year) has elapsed from the date initially registered in the optical disk unit 200, the personal computer 100 automatically displays a message indicating that the warranty has expired (step 5) or other message according to the time which has elapsed from the initial registration date.

The server system 320 provides information about new versions of software products, methods for avoiding failures, and new products based on the information such as the date registered. When a new version of the condition monitoring program installed in the personal computer 100 or a new diagnostics tool is released, they can be directly downloaded from the server system 320 to the personal computer 100 (step 6).

Referring to FIG. 8, a process for monitoring conditions in the optical disk unit and a procedure performed if an error occurs will be described below.

When the personal computer 100 and the optical disk unit 200 are turned on, the initial registration date in the optical disk unit 200 is read out and checked. From this date information, it is determined in the personal computer 100 whether or not the warranty expiration date or a periodic maintenance date, for example, is reached and a message is presented to the user if required (step 7).

If an error occurs in the optical disk unit 200, the occurrence of the error is reported from the optical disk unit 200 to the personal computer 100, depending on the error. In response to the report, or at regular time intervals, log information in the optical disk unit is read out and error diagnostics is performed. As a result of the diagnostics, a message prompting the user to perform head or medium cleaning is presented, for example. An error detected in the optical disk unit is written onto flash ROM (F-ROM) in the unit as a log information(step 8). Error information provided from the optical disk unit to the personal computer 100 is also sent from the personal computer 100 to the SQL server 322 (step 9). An error that cannot be diagnosed by the personal computer 100 is diagnosed by the server system 320 and the result of the diagnostics and a remedy are sent from the server system 320 to the personal computer 100 by e-mail or other measures (step 10).

If an error occurs and the result of the diagnostics performed in the personal computer 100 shows that the warranty on the unit has expired and purchasing a new one is less expensive than repairing the unit, a message indicating this is presented. If the unit is diagnosed as having a failure, a message indicating that it has the failure and requires repair is presented (step 11).

By the above-described procedure, the number of repair requests from users who misconceive defects on optical disk media as failures in optical disk units can be reduced. Also, users who find that purchasing a new optical disk unit is less expensive than repair through the procedure do not request for repair. As a result, the number of optical disk units sent to the third party 1300 for failure diagnosis which requires manpower can be significantly reduced (step 12).

Optical disk units yet sent to the third party 1300 for failure diagnosis are diagnosed in detail and optical disk units found to require repair are sent to the factory 1400, where they are repaired (step 13).

FIGS. 9 through 15 show data used in the system shown in FIG. 6. The data will be described below.

FIG. 9 shows log information in the optical disk unit.

Error detection sensors are included in the optical disk unit. If an error occurs and the type of the error has been specified by the user as one that should be logged (at step 2 in FIG. 7), log information about the error is generated as shown in FIG. 9. The generated log information is stored in the optical disk unit.

FIG. 10 shows base date information.

The date information shown in FIG. 10 is stored in the optical disk unit. The "initial registration date" is a date which is registered the first time the optical disk unit is connected to the personal computer. Once the date is registered, it will not be re-registered throughout the life of the optical disk unit.

When the user performs cleaning of the head of the optical disk unit, the date is written as the "most recent cleaning date" in FIG. 10. The same date as the "initial registration date" is registered initially. The most recent cleaning date is used for calculating the next cleaning date.

FIG. 11 shows the version number and date of manufacture of the optical disk unit that are stored in the optical disk unit.

The information shown is written in the optical disk unit during its manufacturing process and is never overwritten. The first time the unit is connected to the personal computer, the information is transmitted to the personal computer and also to the server system.

FIG. 12 shows customer information.

The customer information is input by the user into the personal computer when the customer information is registered in the server system.

FIG. 13 shows information stored on the CD-ROM supplied with the optical disk unit purchased.

The information shown is the version numbers of the condition monitoring program 1000 (diagnostics tool version number), MO driver 1100 (driver version number), and MO formatter 1200 (formatter version number) shown in FIG. 4. This information is installed into the personal computer when the condition monitoring program 1000, MO driver 1100, and MO formatter 1200 shown in FIG. 4 are installed and managed in the personal computer 100.

FIG. 14 shows accumulative information.

The accumulative information is updated and stored in the optical disk unit. In this example, LD (Laser Diode) light emission time provided in the optical disk unit, the number of LD light-ups/light-outs, and operation time of the optical disk unit are recorded.

FIG. 15 shows reference information to be compared with the accumulative information shown in FIG. 14.

In this example, guaranteed LD light emission time, a guaranteed number of LD light-ups/light-outs, and guaranteed operation time of the optical disk unit are recorded in agreement with the accumulative information shown in FIG. 14.

The reference information shown in FIG. 15 is stored on the CD-ROM supplied with the optical disk unit and installed from the CD-ROM into the personal computer.

Programs constituting the condition diagnostics program will be illustrated below.

Figure 16:
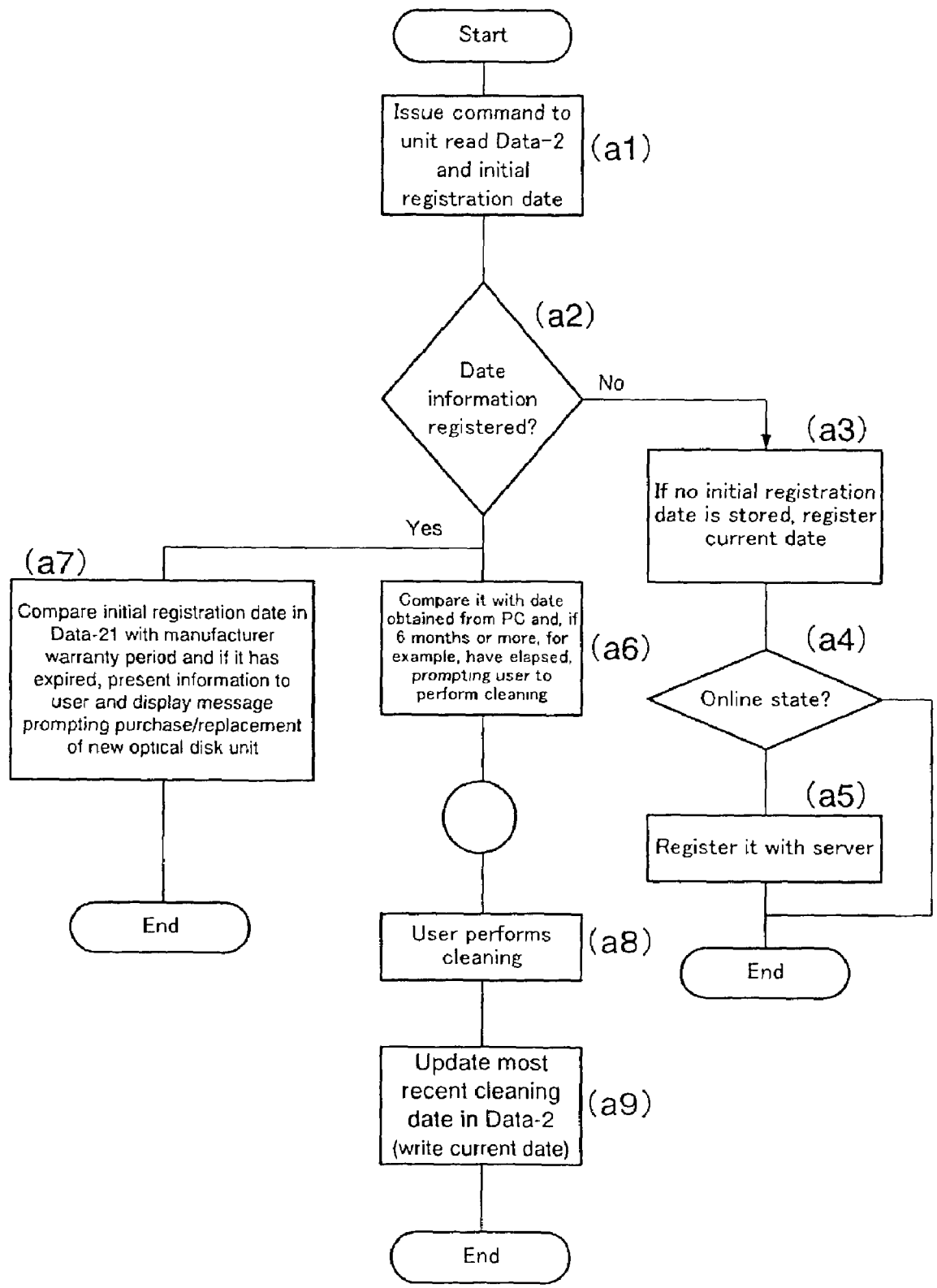
FIG. 16 shows a flowchart of a process for reading a date.

FIG. 16 shows a flowchart of a process for reading a date.

In this example, the personal computer issues a command to the optical disk unit 200 for reading an initial registration date and the most recent cleaning date shown in FIG. 10 and unit information shown in FIG. 11 (step a1) to determine whether an initial registration date is registered (step a2). If no initial registration date has been registered, it registers the current date in the optical disk unit (step a3), and if it is connected online to the SQL server (step a4), it also sends such as the initial registration date, the unit information shown in FIG. 11, and customer information (see FIG. 12) inputted by the user to the SQL server 322 (see FIG. 6). Then this information is registered in the SQL server 322 as customer information (step a5).

If an initial registration date has been registered in the optical disk unit, the most recent cleaning date, for example, is compared with the current date, which is obtained from the personal computer. If six months or more, for example, have elapsed from the most recent cleaning date, a message for prompting the user to perform cleaning is presented (step a6). If it is determined that the warranty period of the unit has expired, for example, a message indicating the expiration of the warranty or prompting the user to purchase a new optical disk unit is presented (step a7).

If the message for prompting the user to perform cleaning is presented (step a6), the user performs the cleaning (step a8) and the date on which the cleaning is performed is inputted to update the most recent cleaning date shown in FIG. 10 (step a9).

Figure 17:
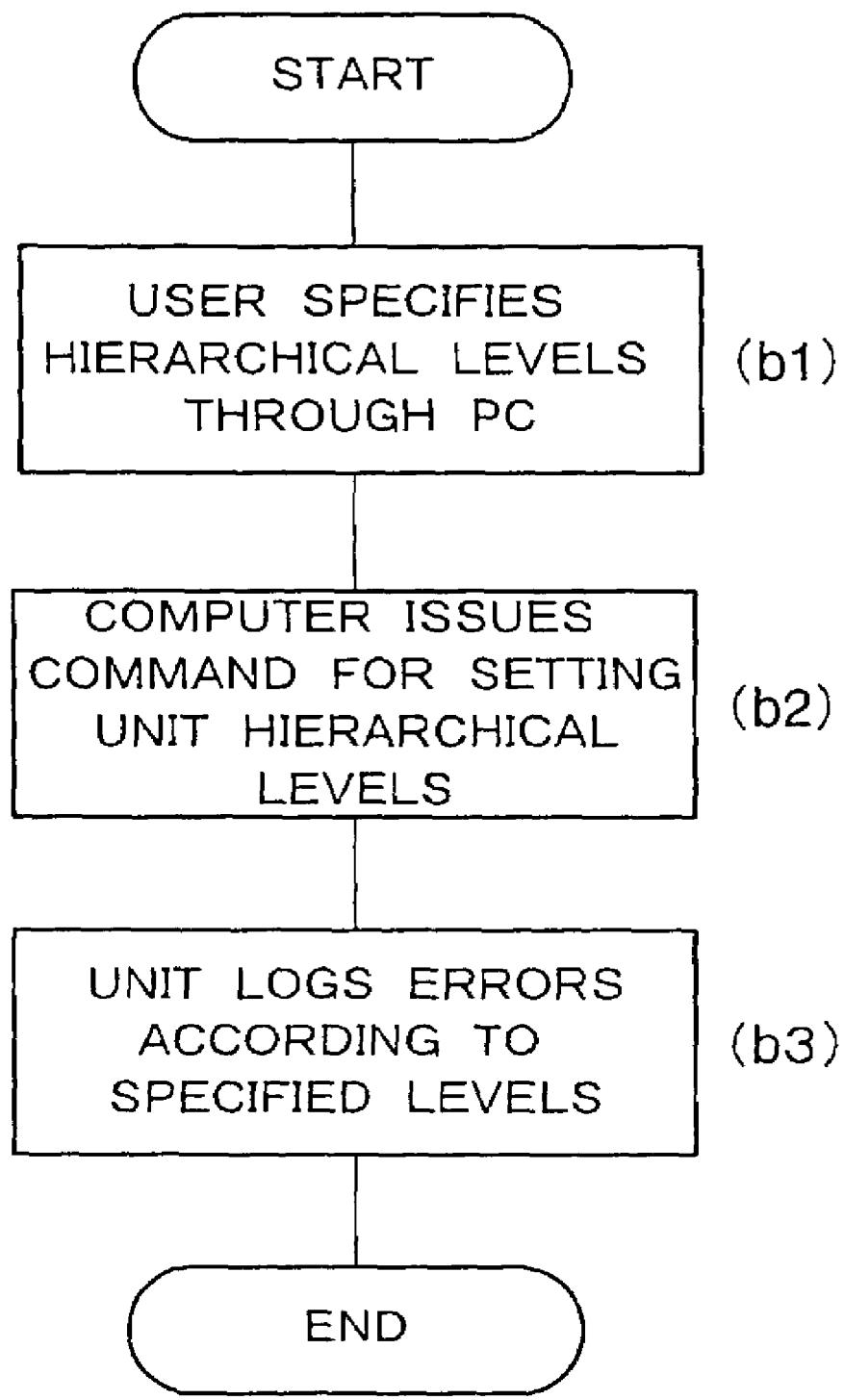
FIG. 17 shows a flowchart of a program for initializing log function.

FIG. 17 shows a flowchart of a program for initializing a log function.

On the personal computer, the user associates a level with kinds of errors (error code), like, level A (alarm level) with an error having error code 0001, level B (retry level) with an error having error code 0002, and level C (serious error) with an error having error code 0003 and specifies levels (for example levels B and C) to be recorded as log information (see FIG. 9) (step b1). The personal computer issues a command setting the levels (step b2) and the optical disk unit receives the command and subsequently collects log information about errors according to the command (step b3).

Figure 18:
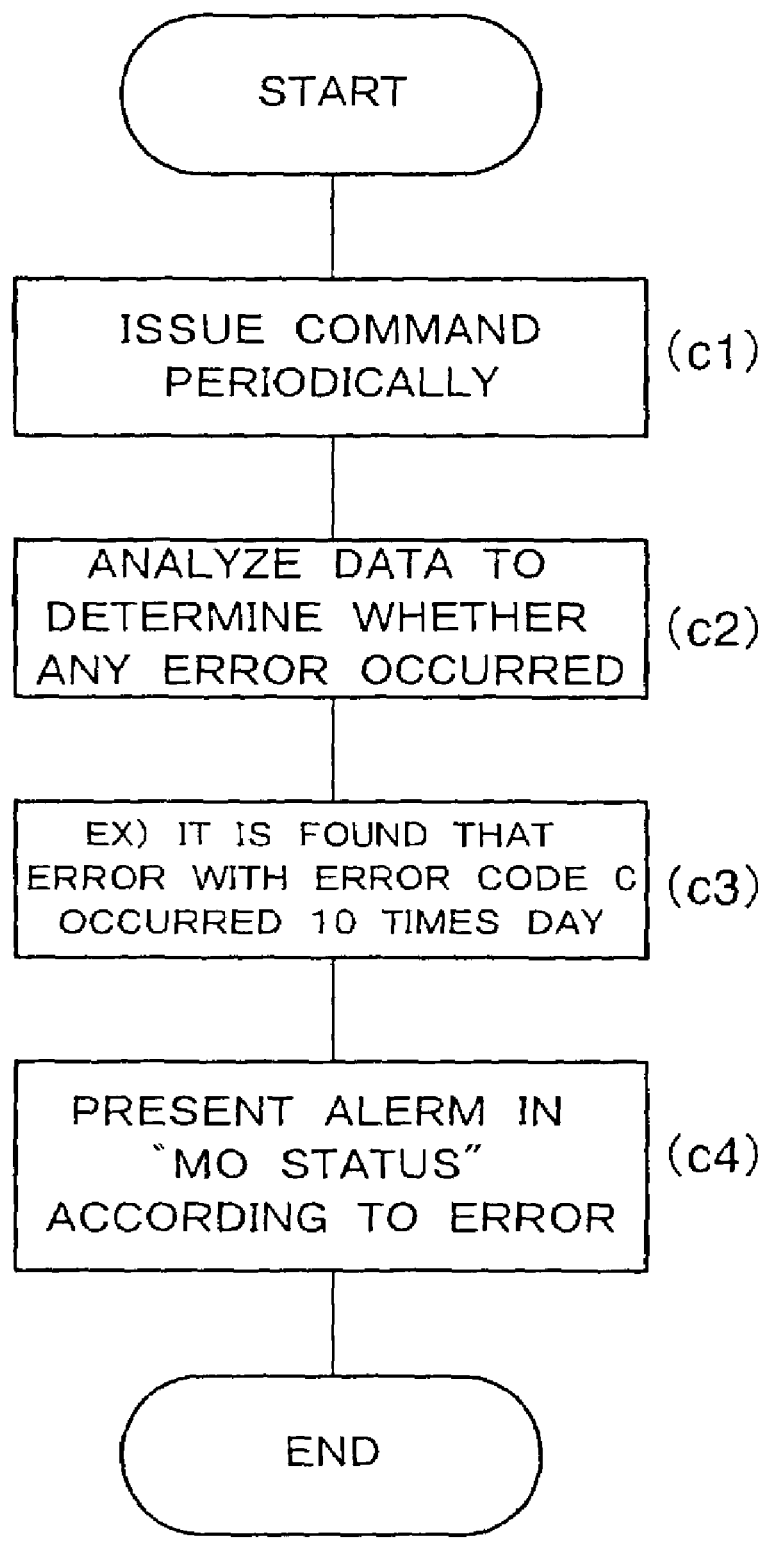
FIG. 18 shows a flowchart of a program for periodically diagnosing log information.

FIG. 18 shows a flowchart of a program for periodically diagnosing log information.

In this example, a command is periodically issued to the optical disk unit to request it to send log information (step c1). The log information sent from the optical disk unit in response to the command is analyzed to determine whether there is any abnormal conditions (step c2). If it is found that a pre-specified error occurred with predefined frequency, for example an error having error code C occurred 10 or more times a day (step c3), an alarm is presented in an MO status message (see FIG. 5) according to the error (step c4).

The user sees the MO status and addresses the error.

Figure 19:
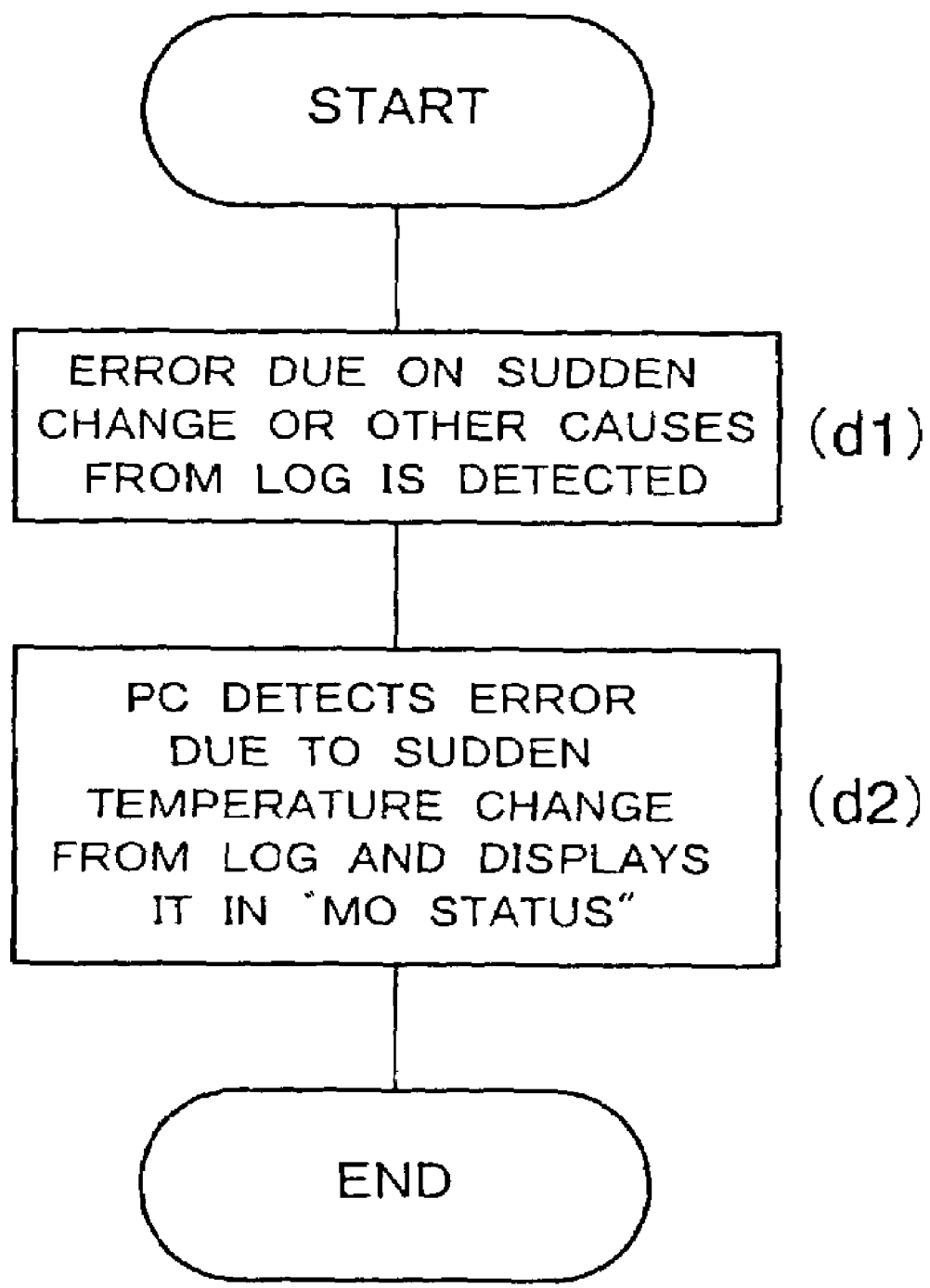
FIG. 19 shows a flowchart of a program for diagnostics performed if an urgent error occurs.

FIG. 19 shows a flowchart of a program for diagnostics performed if an urgent error occurs.

The program in FIG. 19 is activated in response to a report from the optical disk unit if a predefined urgent error occurs in the optical disk unit. When the program is activated, it reads log information and detects any error, such as a sudden change, from the log information (step d1) and displays it in an MO status message (step d2).

Again, the user sees the MO status message and addresses the error.

Figure 20:
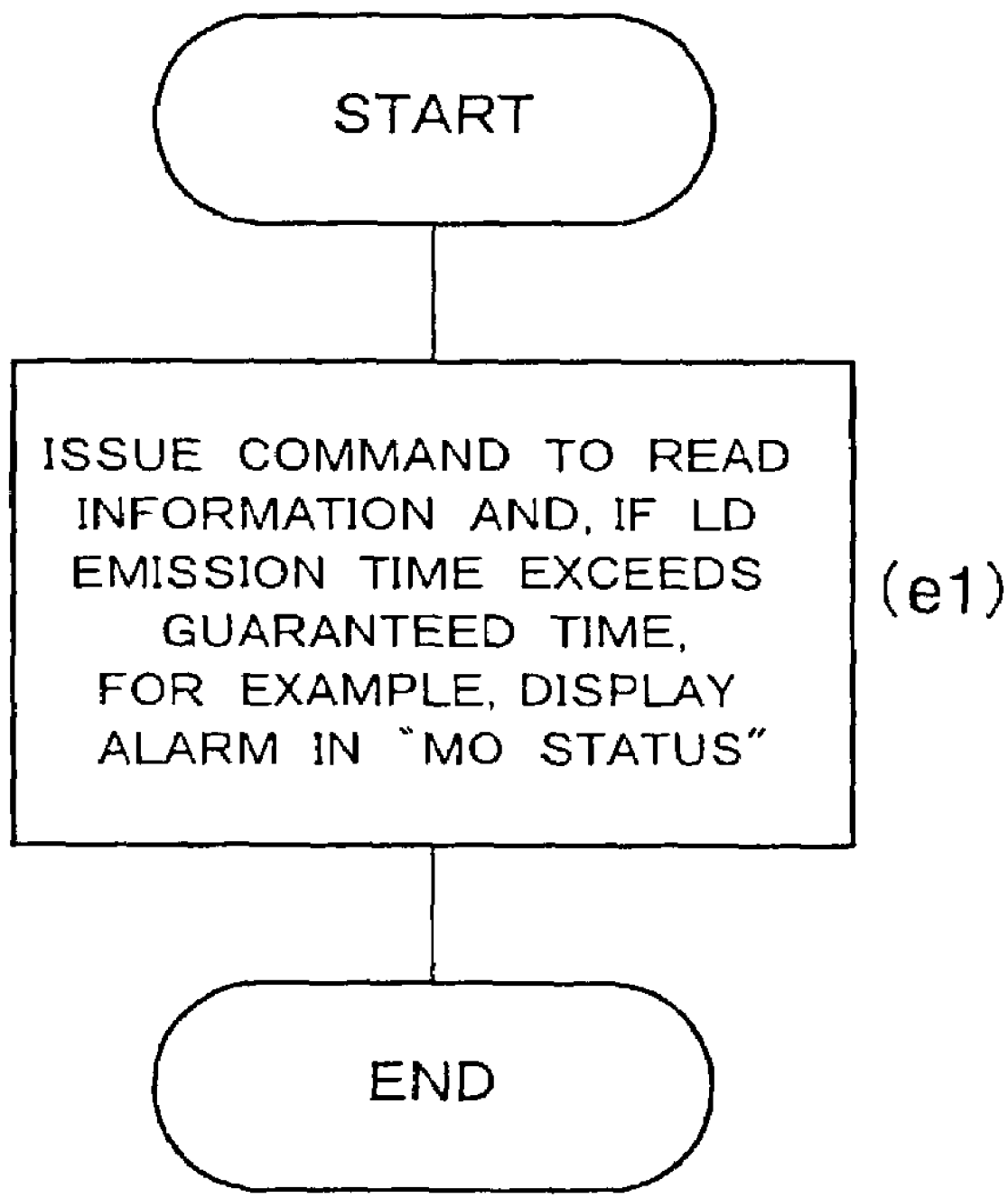
FIG. 20 shows a flowchart of an accumulative information diagnostics program.

FIG. 20 shows a flowchart of an accumulative information diagnostics program.

A command is issued for reading accumulative information (see FIG. 14), which is updated and cumulatively stored in the optical disk unit. The accumulative information obtained is compared with the reference information shown in FIG. 15. Here, if LD light emission time exceeds the guaranteed LD light emission time, an alarm is presented in the MO status display (step e1).

This embodiment allows the user to properly know the occurrence of an error and how to handle, thereby significantly reducing the number of repair requests.

While this embodiment has been described with respect to the optical disk unit, the present invention is applicable to any storage units that are loaded with and access the loaded storage medium and programs for monitoring conditions in the storage units.

The embodiment has been described with respect to a personal computer as an example of a host apparatus as referred to in the present invention. The host apparatus as referred to in the present invention may be any of apparatuses that can perform two-way communication with storage units, including a hard disk unit connected to today's television set or video unit, and, as hosts, can issue direction to those storage units.

While "date" information is used in the above-described embodiment, the "date information" as referred to in the present invention may be date and time or a time stamp code that can identify a date or date and time.

While the embodiment has been described with respect to the optical disk unit as an example of a storage unit as referred to in the present invention, the storage unit is not limited to optical disk units. Instead, the storage unit may be a magnetic disk unit such as a hard disk unit or flexible disk unit, or a card unit.

While the optical disk unit is externally connected to the personal computer in the embodiment described above, it may be internally installed in a host apparatus such as a personal computer.

While the optical disk unit is connected to the personal computer over a cable in the embodiment described above, the storage unit according to the present invention is not limited to this. It may be connected to a host apparatus by wireless communication to communicate with it.

As described above, the present invention provides a storage unit having a configuration effective for providing information to a user so that the user can address condition of the storage unit and a condition monitoring program storage medium containing a condition monitoring program for monitoring the condition of the storage unit. Thus, the user can address a change in the condition of the storage unit in an early stage and, as a result, the number of repair requests is significantly reduced. In addition, the sales of new storage units can be facilitated.

What is claimed is:

1. A storage unit connected to a host apparatus for accessing a storage medium according to a direction from said host apparatus, comprising:
    a date storage module that stores date information about first-use-starting-date reported from said connected host apparatus and retaining said date information;
    a transmitter that transmits the date information stored in said date storage module to said connected host apparatus in response to a request from said host apparatus; and a date information receiving module that receives date information indicating a current date from said host apparatus to cause said storage module to store said date information about the current date, in response to a report transmitted by said transmitter, said report indicating that no date is set.

2. A condition monitoring program storage medium containing a condition monitoring program executed in a host apparatus to which a storage unit that accesses a storage medium according to a direction from said host apparatus is connected, said condition monitoring program configuring in said host apparatus a condition monitor that monitors the condition of said storage unit,
    wherein said condition monitor comprises:
    a transmission direction module that directs said storage unit connected to said host apparatus to transmit date information indicating a first-use-starting date;
    a receiver that receives the date information indicating the first-use-starting date or a report indicating that no date is set, said date information indicating the first-use-starting date and said report being transmitted from said storage unit in response to the direction from said transmission direction module for the transmission of the date information indicating the first-use-starting date; and
    a date information reporting module that transmits date information indicating a current date to said storage unit to cause said storage unit to store said date information about the current date, in response to the reception by said receiver of said report indicating that no date is set.

3. The condition monitoring program recording medium according to claim 2, wherein said condition monitoring program configures the condition monitor further comprising a history setting module that sets in said storage unit an abnormal condition type to be recorded as a history record, said abnormal condition type being inputted in a monitor unit in response to an operation for inputting the abnormal condition type.

4. The condition monitoring program storage medium according to claim 2, wherein said transmission direction module periodically directs said storage unit to transmit the abnormal condition history.

5. The condition monitoring program storage medium according to claim 2, wherein said transmission direction module directs said storage unit to transmit the abnormal condition history in response to a report of the occurrence of an abnormal condition provided from said storage unit.

6. A condition monitoring program storage medium containing a condition monitoring program executed in a host apparatus to which a storage unit that accesses a storage medium according to a direction from said host apparatus is connected, said condition monitoring program configuring in said host apparatus a condition monitor that monitors the condition of said storage unit,
    wherein said condition monitoring program comprises in said host apparatus:
    a transmission direction module that directs said storage unit connected to said host apparatus to transmit date information indicating a first-use-starting date;
    a receiver that receives said date information indicating the first-use-starting date transmitted, under the direction of said transmission direction module, from said storage unit;
    a message presentation module that presents a message according to the number of days elapsing between a date indicated by the date information indicating the first-use-starring date received by said receiver and the current date; and a date information reporting module that transmits date information indicating a current date to said storage unit to cause said storage unit to store said date information about the current date, in response to a report received by said receiver, said report indicating that no date is set.

7. A condition monitoring program product stored in a storage medium and configured to be executed in a host apparatus to which a storage unit that accesses another storage medium according to a direction from said host apparatus is connected, said condition monitoring program product configuring in said host apparatus a condition monitor that monitors the condition of said storage unit, wherein said condition monitor comprises:

a transmission direction module that directs said storage unit connected to said host apparatus to transmit date information indicating a first-use-starting date;

a receiver that receives the date information indicating the first-use-starting date or a report indicating that no date is set, said date information indicating the first-use-starting date and said report being transmitted from said storage unit in response to the direction from said transmission direction module for the transmission of the date information indicating the first-use-starting date; and a date information reporting module that transmits date information indicating a current date to said storage unit to cause said storage unit to store said date infomiation about the current date, in response to the reception by said receiver of said report indicating that no date is set.

* * * * *

UNITED STATES PATENT AND TRADEMARK OFFICE
CERTIFICATE OF CORRECTION

PATENT NO. : 7,191,367 B2  Page 1 of 1
APPLICATION NO. : 10/319766
DATED : March 13, 2007
INVENTOR(S) : Ito et al.

It is certified that error appears in the above-identified patent and that said Letters Patent is hereby corrected as shown below:

On the Patent Face:

Under "(75) Inventors", delete "kenjiYoneki" and insert --Kenji Yoneki--.

In the Claims:

Col. 16, line 57, delete "starring" and insert --starting--.

Signed and Sealed this

Seventeenth Day of July, 2007

JON W. DUDAS
*Director of the United States Patent and Trademark Office*